United States Patent
Verma et al.

(10) Patent No.: US 11,899,636 B1
(45) Date of Patent: Feb. 13, 2024

(54) CAPTURING AND MAINTAINING A TIMELINE OF DATA CHANGES IN A RELATIONAL DATABASE SYSTEM

(71) Applicant: FMR LLC, Boston, MA (US)

(72) Inventors: Kriti Kumar Verma, Morrisville, NC (US); Sunil Gurusiddappa, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 18/221,584

(22) Filed: Jul. 13, 2023

(51) Int. Cl.
*G06F 16/00* (2019.01)
*G06F 16/21* (2019.01)
*G06F 16/23* (2019.01)

(52) U.S. Cl.
CPC .......... *G06F 16/219* (2019.01); *G06F 16/217* (2019.01); *G06F 16/2358* (2019.01)

(58) Field of Classification Search
CPC ... G06F 16/219; G06F 16/217; G06F 16/2358
USPC ........................................................ 707/695
See application file for complete search history.

(56) References Cited

U.S. PATENT DOCUMENTS

| | | |
|---|---|---|
| 6,463,439 B1 * | 10/2002 | Dahlberg .............. G06F 16/217 707/999.102 |
| 8,280,754 B2 | 10/2012 | Chowdhary et al. |
| 11,347,714 B2 | 5/2022 | Cseri et al. |
| 11,403,274 B1 | 8/2022 | Laguna Rueda et al. |
| 2014/0278755 A1 | 9/2014 | Eberl et al. |
| 2020/0183908 A1 | 6/2020 | Muralidhar et al. |
| 2021/0248127 A1 | 8/2021 | Cseri et al. |

\* cited by examiner

*Primary Examiner* — Chelcie L Daye
(74) *Attorney, Agent, or Firm* — Cesari & McKenna, LLP

(57) ABSTRACT

Methods and apparatuses are described for capturing and maintaining a timeline of data changes in a relational database system. A server identifies changed records from relational database tables. The server analyzes the changed records to determine a maximum timestamp for each primary key and extracts the changed records associated with each primary key where a timestamp is equal to or greater than the maximum timestamp for the primary key. The server generates timestamp ranges for each primary key, each comprising an effective date and an expiration date. The server determines whether each key-date combination already exists in a historical record table. The server updates an expiration date of an existing record in the historical record table using the effective date and inserts a new record for the timestamp range using the captured records.

15 Claims, 12 Drawing Sheets

Demographics 202

| Field Name | Field Description |
|---|---|
| ID Number | ID number of the employee / customer *(Primary Key)* |
| First Name | First name of the employee / customer |
| Last Name | Last name of the employee / customer |
| Date of Birth | Date of birth of the employee / customer |
| Address Line 1 | Street address of the employee / customer |
| Address Line 2 | Street address of the employee / customer |
| City | City of the employee / customer |
| Zip Code | Zip code of the employee / customer |
| Country | Country of the employee / customer |
| ... | ... |
| Update Date and Time | Date and time the customer / employee's data was updated |

Employment Event 204

| Field Name | Field Description |
|---|---|
| ID Number | ID number of the employee / customer *(Primary Key)* |
| Event Code | HIR ‖ TXF ‖ TER ‖ REHR |
| Event Name | Hire ‖ Transfer ‖ Termination ‖ Re-hire |
| Event Description | Person first joined the company<br>Person transferred to different department<br>Person left the company<br>Person re-hired by the company |
| Event Date and Time | Date and time the employment event happened |
| Update Date and Time | Date and time the system received the event information |

Life Event 206

| Field Name | Field Description |
|---|---|
| ID Number | ID number of the employee / customer *(Primary Key)* |
| Event Code | BRTH ‖ MAR ‖ DIV ‖ ADPT |
| Event Name | Birth ‖ Marriage ‖ Divorce ‖ Adoption |
| Event Description | Person had a child<br>Person got married<br>Person got divorced<br>Person adopted a child |
| Event Date and Time | Date and time the life event happened |
| Update Date and Time | Date and time the system received the event information |

| Employee / Customer Information | |
|---|---|
| Field Name | Field Description |
| ID Number | ID number of the employee / customer (*Primary Key*) |
| First Name | First name of the employee / customer |
| Last Name | Last name of the employee / customer |
| Date of Birth | Date of birth of the employee / customer |
| Address Line 1 | Street address of the employee / customer |
| Address Line 2 | Street address of the employee / customer |
| City | City of the employee / customer |
| Zip Code | Zip code of the employee / customer |
| Country | Country of the employee / customer |
| Hire Date | Date employee / customer hired |
| Job Transfer Date | Date employee / customer transferred jobs |
| Termination Date | Date employee / customer fired |
| Re-hire Date | Date employee / customer re-hired |
| Marriage Date | Date employee / customer got married |
| ... | ... |
| Update Date and Time | Date and time the customer / employee's data was updated |

208

| ID Number | Changed Data Table | Changed Data Column | Changed Value | Timestamp |
|---|---|---|---|---|
| 100 | Demographics | Address Line 1 | 123 Main Street | 03-01-2023 08:45:00 |
| 100 | Demographics | City | Raleigh | 03-01-2023 08:45:00 |
| 100 | Demographics | Zip Code | 27602 | 03-01-2023 08:45:00 |
| 100 | Life Events | Event Code | MAR | 04-22-2023 13:19:03 |
| 100 | Life Events | Event Date and Time | 04-02-2023 12:00:00 | 04-22-2023 13:19:03 |
| 100 | Life Events | Update Date and Time | 04-22-2023 13:19:03 | 04-22-2023 13:19:03 |
| 100 | Demographics | Address Line 1 | 467 Elm Street | 04-22-2023 13:19:03 |
| 100 | Demographics | City | Cary | 04-22-2023 13:19:03 |
| 100 | Demographics | Zip Code | 27519 | 04-22-2023 13:19:03 |

FIG. 4

| ID No. | Eff. Date | Exp. Date | First Name | Last Name | ... | Address Line 1 | City | Zip Code | Marriage Date | Job Transfer Date |
|---|---|---|---|---|---|---|---|---|---|---|
| 100 | 01-01-2018 10:42:00 | 10-05-2019 08:44:59 | John | Smith | ... | 45 West Road | Charlotte | 28105 | <NULL> | 01-01-2018 10:42:00 |
| 100 | 10-05-2019 08:45:00 | 12-31-9999 11:59:59 | John | Smith | ... | 45 West Road | Charlotte | 28105 | <NULL> | 10-05-2019 08:45:00 |

FIG. 5

| ID No. | Eff. Date | Exp. Date | First Name | Last Name | ... | Address Line 1 | City | Zip Code | Marriage Date | Job Transfer Date |
|---|---|---|---|---|---|---|---|---|---|---|
| 100 | 01-01-2018 10:42:00 | 10-05-2019 08:44:59 | John | Smith | ... | 45 West Road | Charlotte | 28105 | <NULL> | 01-01-2018 10:42:00 |
| 100 | 10-05-2019 08:45:00 | 03-01-2023 08:44:59 | John | Smith | ... | 45 West Road | Charlotte | 28105 | <NULL> | 10-05-2019 08:45:00 |

602 ↗ (pointing to Exp. Date column)

| ID No. | Eff. Date | Exp. Date | First Name | Last Name | ... | Address Line 1 | City | Zip Code | Marriage Date | Job Transfer Date | ... |
|---|---|---|---|---|---|---|---|---|---|---|---|
| 100 | 01-01-2018 10:42:00 | 10-05-2019 08:44:59 | John | Smith | ... | 45 West Road | Charlotte | 28105 | <NULL> | 01-01-2018 10:42:00 | ... |
| 100 | 10-05-2019 08:45:00 | 03-01-2023 08:44:59 | John | Smith | ... | 45 West Road | Charlotte | 28105 | <NULL> | 10-05-2019 08:45:00 | ... |
| 100 | 03-01-2023 08:45:00 | 12-31-9999 11:59:59 | John | Smith | ... | 123 Main Street | Raleigh | 27602 | <NULL> | 10-05-2019 08:45:00 | ... |

| ID No. | Eff. Date | Exp. Date | First Name | Last Name | ... | Address Line 1 | City | Zip Code | Marriage Date | Job Transfer Date |
|---|---|---|---|---|---|---|---|---|---|---|
| 100 | 01-01-2018 10:42:00 | 10-05-2019 08:44:59 | John | Smith | ... | 45 West Road | Charlotte | 28105 | <NULL> | 01-01-2018 10:42:00 |
| 100 | 10-05-2019 08:45:00 | 03-01-2023 08:44:59 | John | Smith | ... | 45 West Road | Charlotte | 28105 | <NULL> | 10-05-2019 08:45:00 |
| 100 | 03-01-2023 08:45:00 | 04-02-2023 11:59:59 | John | Smith | ... | 123 Main Street | Raleigh | 27602 | <NULL> | 10-05-2019 08:45:00 |
| 100 | 04-02-2023 12:00:00 | 12-31-9999 11:59:59 | John | Smith | ... | 123 Main Street | Raleigh | 27602 | 04-02-2023 12:00:00 | 10-05-2019 08:45:00 |

FIG. 7B

| ID No. | Eff. Date | Exp. Date | First Name | Last Name | ... | Address Line 1 | City | Zip Code | Marriage Date | Job Transfer Date | ... |
|---|---|---|---|---|---|---|---|---|---|---|---|
| 100 | 01-01-2018 10:42:00 | 10-05-2019 08:44:59 | John | Smith | ... | 45 West Road | Charlotte | 28105 | <NULL> | 01-01-2018 10:42:00 | ... |
| 100 | 10-05-2019 08:45:00 | 03-01-2023 08:44:59 | John | Smith | ... | 45 West Road | Charlotte | 28105 | <NULL> | 10-05-2019 08:45:00 | ... |
| 100 | 03-01-2023 08:45:00 | 04-02-2023 11:59:59 | John | Smith | ... | 123 Main Street | Raleigh | 27602 | <NULL> | 10-05-2019 08:45:00 | ... |
| 100 | 04-02-2023 12:00:00 | 04-22-2023 13:19:02 | John | Smith | ... | 123 Main Street | Raleigh | 27602 | 04-02-2023 12:00:00 | 10-05-2019 08:45:00 | ... |
| 100 | 04-22-2023 13:19:03 | 12-31-9999 11:59:59 | John | Smith | ... | 467 Elm Street | Cary | 27519 | 04-02-2023 12:00:00 | 10-05-2019 08:45:00 | ... |

FIG. 7C

*Before Data Correction*

| ID No. | Eff. Date | Exp. Date | First Name | Last Name | ... | Address Line 1 | City | Zip Code | Marriage Date | Job Transfer Date | ... |
|---|---|---|---|---|---|---|---|---|---|---|---|
| 247 | 01-01-2014 09:12:23 | 06-03-2021 14:49:02 | Lisa | Jones | ... | 27 Shore Road | Boston | 02210 | <NULL> | 01-01-2014 09:12:23 | ... |
| 247 | 06-03-2021 14:49:03 | 02-22-2023 12:15:00 | Lisa | Jones | ... | 27 Shore Road | Boston | 02210 | <NULL> | 06-03-2021 14:49:03 | ... |
| 247 | 02-22-2023 12:15:01 | 04-03-2023 09:01:44 | Lisa | Jones | ... | 27 Shore Road | Boston | 02210 | <NULL> | 02-22-2023 12:15:01 | ... |
| 247 | 04-03-2023 09:01:45 | 12-31-9999 11:59:59 | Lisa | Jones | ... | 27 Shore Road | Boston | 02210 | <NULL> | 04-03-2023 09:01:45 | ... |

*After Data Correction*

| ID No. | Eff. Date | Exp. Date | First Name | Last Name | ... | Address Line 1 | City | Zip Code | Marriage Date | Job Transfer Date | ... |
|---|---|---|---|---|---|---|---|---|---|---|---|
| 247 | 01-01-2014 09:12:23 | 11-04-2019 13:33:22 | Lisa | Jones | ... | 27 Shore Road | Boston | 02210 | <NULL> | 01-01-2014 09:12:23 | ... |
| 247 | 11-04-2019 13:33:23 | 06-03-2021 14:49:02 | Lisa | Jones | ... | 27 Shore Road | Boston | 02210 | <NULL> | 11-04-2019 13:33:23 | ... |
| 247 | 06-03-2021 14:49:03 | 02-22-2023 12:15:00 | Lisa | Jones | ... | 27 Shore Road | Boston | 02210 | <NULL> | 06-03-2021 14:49:03 | ... |
| 247 | 02-22-2023 12:15:01 | 04-03-2023 09:01:44 | Lisa | Jones | ... | 27 Shore Road | Boston | 02210 | <NULL> | 02-22-2023 12:15:01 | ... |
| 247 | 04-03-2023 09:01:45 | 12-31-9999 11:59:59 | Lisa | Jones | ... | 27 Shore Road | Boston | 02210 | <NULL> | 04-03-2023 09:01:45 | ... |

FIG. 8B

CAPTURING AND MAINTAINING A TIMELINE OF DATA CHANGES IN A RELATIONAL DATABASE SYSTEM

TECHNICAL FIELD

This application relates generally to methods and apparatuses, including computer program products, for capturing and maintaining a timeline of data changes in a relational database system.

BACKGROUND

Many database software platforms are built upon a relational data paradigm, where items of information are stored in tables that may be linked by defined relationships. In relational databases and flat file databases, a table is a set of data elements (values) using a model of vertical columns (that are identifiable by name) and horizontal rows, the cell being the unit where a row and column intersect. A table has a specified number of columns but can have any number of rows. Typically, each row in a table is associated with a primary key (PK). The primary key can be defined as one column value, or a combination of column values, that uniquely identifies each row in the table. In most scenarios, the primary key is a single column—such as an identifier or identity column.

In some instances, organizations utilize business analytics platforms to collect, synthesize and analyze the data contained within a plurality of tables from one or more relational databases (also called source databases). Often, the business analytics platforms include data structures that combine data fields from multiple source tables into a single data structure that represents, e.g., a person or an entity and captures many aspects of that person or entity that may be distributed across the multiple source tables. Through this combination of diverse data elements, the business analytics platform can more efficiently consume the relational data. However, the data stored in relational database platforms frequently changes. When one or more data values are changed in a relational database, the most common scenario is for the database platform to overwrite the existing data elements values with the new values. This can result in the inability to track historical data values for the data elements over time. In the event that the analytics platforms contain erroneous data or have to be updated to include missing data, it can be difficult to piece together the incorrect or missing data elements for inclusion in the analytics database—especially if the incorrect/missing data comprises historical values. Furthermore, ad-hoc changes made to data in the analytics database by different personnel or systems can cause data discrepancies and loss of data consistency in the analytics system.

SUMMARY

Therefore, what is needed are methods and systems for capturing and maintaining a timeline of data changes in a relational database system, including historical changes to data elements in source databases. The techniques described herein beneficially capture the values for such source data elements—including recording the range of time that a particular data element had a specific value—in order to generate a historical record of the data changes from which a timeline of changes to the data elements can be created and subsequently used to verify and/or correct data in an analytics system.

The invention, in one aspect, features a system for capturing and maintaining a timeline of data changes in a relational database system. The system comprises a server computing device having a memory for storing computer-executable instructions and a processor that executes the computer-executable instructions. The server computing device identifies a plurality of changed records from each of a plurality of relational database tables, each changed record comprising a primary key, a timestamp, and one or more changed data fields. The server computing device analyzes the changed records to determine a minimum timestamp for each primary key. The server computing device extracts the changed records associated with each primary key from each relational database table where the timestamp associated with each changed record is equal to or greater than the minimum timestamp for the primary key. The server computing device generates one or more timestamp ranges for each primary key using the timestamps for the primary key in the captured records, each timestamp range comprising an effective date and an expiration date. The server computing device determines whether each primary key-effective date combination already exists in a historical record table. For each primary key-effective date combination that already exists in the historical record table, the server computing device updates an existing record in the historical record table using the changed data fields from the changed record. For each primary key-effective date combination that does not already exist in the historical record table, the server computing device updates an expiration date of an existing record in the historical record table using the effective date and inserts a new record for the timestamp range, each new record comprising the primary key, the effective date, the expiration date, and the changed data fields from the changed record.

The invention, in another aspect, features a computerized method of capturing and maintaining a timeline of data changes in a relational database system. A server computing device identifies a plurality of changed records from each of a plurality of relational database tables, each changed record comprising a primary key, a timestamp, and one or more changed data fields. The server computing device analyzes the changed records to determine a minimum timestamp for each primary key. The server computing device extracts the changed records associated with each primary key from each relational database table where the timestamp associated with each changed record is equal to or greater than the minimum timestamp for the primary key. The server computing device generates one or more timestamp ranges for each primary key using the timestamps for the primary key in the captured records, each timestamp range comprising an effective date and an expiration date. The server computing device determines whether each primary key-effective date combination already exists in a historical record table. For each primary key-effective date combination that already exists in the historical record table, the server computing device updates an existing record in the historical record table using the changed data fields from the changed record. For each primary key-effective date combination that does not already exist in the historical record table, the server computing device updates an expiration date of an existing record in the historical record table using the effective date and inserts a new record for the timestamp range, each new record comprising the primary key, the effective date, the expiration date, and the changed data fields from the changed record.

The invention, in another aspect, features a computer program product for capturing and maintaining a timeline of data changes in a relational database system. The computer program product comprises a non-transitory computer-readable medium including instructions executed by a server computing device. The server computing device identifies a plurality of changed records from each of a plurality of relational database tables, each changed record comprising a primary key, a timestamp, and one or more changed data fields. The server computing device analyzes the changed records to determine a minimum timestamp for each primary key. The server computing device extracts the changed records associated with each primary key from each relational database table where the timestamp associated with each changed record is equal to or greater than the minimum timestamp for the primary key. The server computing device generates one or more timestamp ranges for each primary key using the timestamps for the primary key in the captured records, each timestamp range comprising an effective date and an expiration date. The server computing device determines whether each primary key-effective date combination already exists in a historical record table. For each primary key-effective date combination that already exists in the historical record table, the server computing device updates an existing record in the historical record table using the changed data fields from the changed record. For each primary key-effective date combination that does not already exist in the historical record table, the server computing device updates an expiration date of an existing record in the historical record table using the effective date and inserts a new record for the timestamp range, each new record comprising the primary key, the effective date, the expiration date, and the changed data fields from the changed record.

Any of the above aspects can include one or more of the following features. In some embodiments, the plurality of relational database tables comprises a demographics table, an employment event table, and a life event table. In some embodiments, the server computing device loads the records from the historical record table into one or more database tables in a business analytics computing system.

In some embodiments, generating one or more timestamp ranges for each primary key comprises determining each unique timestamp for the primary key in the changed records and arranging the unique timestamps in a temporal sequence; generating a timestamp range for each unique timestamp, including: assigning the unique timestamp as the effective date for the timestamp range, for each unique timestamp other than the most recent unique timestamp, assigning a timestamp immediately before the next unique timestamp in the sequence as the expiration date for the corresponding timestamp range, and for the most recent unique timestamp, assigning a default timestamp as the expiration date for the corresponding timestamp range. In some embodiments, the default timestamp is a null value or a distant future value.

In some embodiments, identifying a plurality of changed records from each of a plurality of relational database tables comprises determining one or more data fields of interest in each relational database table; and identifying the changed records from each relational database table where one or more of the data fields of interest has changed. In some embodiments, the server computing device: receives a request for historical change data from a remote computing device, the request including a primary key and a timestamp range; selects data records from the historical record table that match the primary key from the request; filters the selected data records according to the timestamp range in the request; and returns the filtered data records to the remote computing device in response to the request.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 2A is a diagram of exemplary source tables from one or more source databases.

FIG. 2B is a diagram of an exemplary table in an analytics database that combines data elements from each of the source tables in FIG. 2A.

FIG. 4 is a diagram of exemplary data changes received by the change analysis module from one or more source databases.

FIG. 5 is a diagram of an exemplary historical record table in the historical record database.

FIG. 6 is a diagram of an exemplary historical record table in the historical record database after the timeline management module has performed an update to existing records.

FIGS. 7A, 7B, and 7C are diagrams of an exemplary historical record table after the timeline management module has inserted new records into the historical record table.

FIGS. 8A and 8B are diagrams of an exemplary historical record table both before and after the timeline management module has corrected a data discrepancy in the historical records.

DETAILED DESCRIPTION

Figure 1:
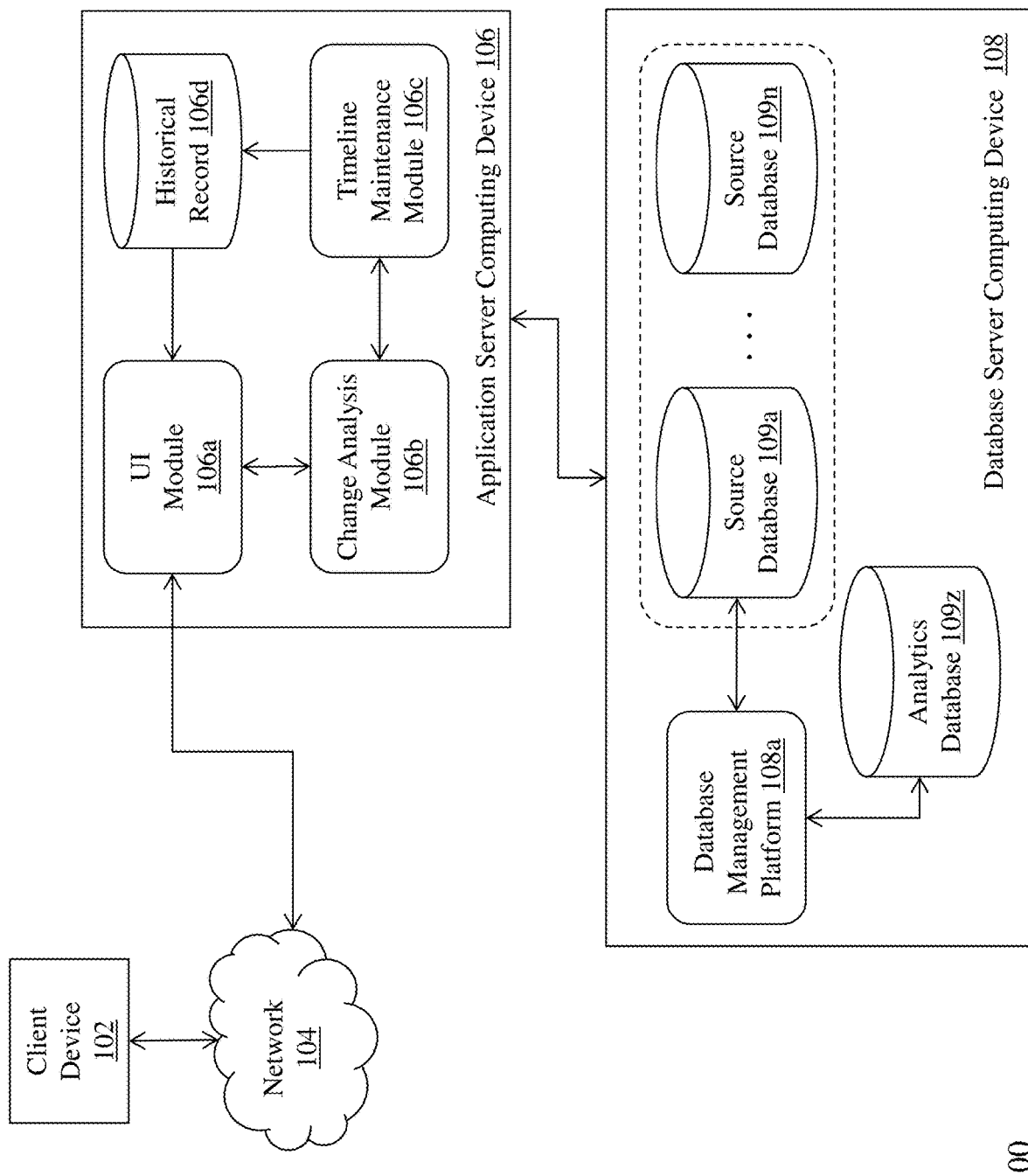
FIG. 1 is a block diagram of a system for capturing and maintaining a timeline of data changes in a relational database system.

FIG. 1 is a block diagram of system 100 for capturing and maintaining a timeline of data changes in a relational database system. System 100 includes client computing device 102 that is coupled via communications network 104 to application server computing device 106. Application server computing device 106 includes user interface (UI) module 106a, change analysis module 106b, timeline maintenance module 106c, and historical record database 106d. Application server computing device 106 is coupled to database server computing device 108, which includes database management platform 108a, one or more source databases 109a-109n, and analytics database 109z.

Exemplary client computing devices 102 include, but are not limited to, tablets, smartphones, laptops, desktops, and other computing devices. It should be appreciated that other types of client computing devices that are capable of connecting to the components of system 100 can be used without departing from the scope of invention. Although FIG. 1 depicts a single client computing device 102, it should be appreciated that system 100 can include any number of client computing devices.

Client computing device 102 can execute software applications, such as browser applications and/or native applications. In some embodiments, a browser application comprises software executing on a processor of client computing device 102 that enables the device to communicate via HTTP or HTTPS with remote servers addressable with URLs (e.g., application server 106) to receive website-related content, including one or more webpages, for rendering in the browser application and presentation on a display device embedded in or coupled to client computing device 102. Exemplary mobile browser application software includes, but is not limited to, Firefox™, Chrome™, Safari™, and other similar software. The one or more webpages can comprise visual and audio content for display to and interaction with a user, which contain data relating to the process of capturing and maintaining a timeline of data changes in a relational database system as described herein.

System 100 also includes application server 106 (e.g., a computing device or devices) that hosts a website, service, or other remote application, to which client computing device 102 can connect to retrieve and display application content. Application server 106 is a combination of hardware, including one or more special-purpose processors and one or more physical memory modules, and specialized software modules including modules 106a, 106b, and 106c that are executed by one or more processors of application server 106. Typically, a website comprises a plurality of visual and non-visual elements that make up content transmitted and displayed to a user when, e.g., browser software on client computing device 102 connects to the application server 106 via communications network 104 (e.g., Internet) and requests content from the website. The elements of a website include, but are not limited to, webpages (e.g., HTML documents), image files, layouts, color sets, stylesheets, document object models (DOM), tracking elements, metadata, URLs, and content (e.g., text, audio, video). Application server 106 also includes historical record database 106d that includes one or more tables containing a historical record of changes to data in databases 109a-109n.

A user at client computing device 102 may establish a communication session with application server 106 via network 104 for the purpose of viewing and interacting with data relating to database management platform 108a and/or databases 109a-109n (e.g., analyzing database tables, metadata, and/or schema, running queries against the database, etc.). To that end, application server 106 includes UI module 106a, change analysis module 106b, timeline management module 106c, and historical record database 106d. However, it should be appreciated that interaction with data relating to the database management platform 108a, source databases 109a-109n, and/or analytics database 109z can also occur automatically through requests from one or more other computing devices (e.g., via application programming interface (API) calls).

Modules 106a, 106b, and 106c are specialized sets of computer software instructions that can be programmed onto one or more dedicated processors in application server 106 and can include designated memory locations and/or registers for executing the specialized computer software instructions. As will be described in greater detail below, UI module 106a can generate display content (e.g., webpages, application user interfaces) that are transmitted to client computing device 102 for presentation to a user (e.g., via a browser, native app, or other software). The user can provide input via the corresponding software that is then transmitted back to UI module 106a for processing—for example, to generate different and/or additional content that displays data to the user.

Change analysis module 106b communicates with database management platform 108a of database server 108 to exchange database information and analyze data contained in one or more databases (e.g., source databases 109a-109n) managed by platform 108a. For example, module 106b can periodically analyze data stored in one or more tables of source databases 109a-109n to determine whether values for certain data elements have been added or changed since the last analysis. Module 106b can identify and capture the changed data for generation and maintenance of a historical record table (e.g., stored in historical record database 106d), as will be described in greater detail below.

Timeline maintenance module 106c communicates with the change analysis module 106b to receive the identified changes to data elements in source databases 109a-109n and update the historical record table(s) in database 106d to incorporate the identified data changes. In some embodiments, timeline maintenance module 106c comprises programmatic instructions that (i) analyze the changed data elements; (ii) determine their relationship to data that currently resides in the historical record table(s); and (iii) identify one or more data change operations to be applied to the historical record table(s) for including the changed data elements in the historical record. Further information about the functionality of timeline maintenance module 106c will be provided in the specification below.

Database server computing device 108 is a combination of hardware, including one or more special-purpose processors and one or more physical memory modules, and specialized software modules including database management platform 108a, that are executed by one or more processors of database server 108. Database management platform 108a is a software module that enables initialization, configuration, and management of one or more databases (e.g., databases 109a-109n). Database server 108 also includes source databases 109a-109n and analytics database 109z. Exemplary database management platforms 108a and corresponding databases 109a-109n for use in system 100 include, but are not limited to, Oracle Database 12c™ available from Oracle Corp.; MySQL™ available from Oracle Corp.; DB2™ available from IBM Corp.; SQL Server™ available from Microsoft Corp.; and Snowflake™ available from Snowflake Inc.

In some embodiments, source databases 109a-109n are relational databases that are managed by relational database management system (RDBMS) software of database management platform 108a. In these embodiments, source databases 109a-109n can be configured to receive, generate, and store specific segments of data using a relational database paradigm, and source databases 109a-109n are controlled by database management platform 108a. In some embodiments, all or a portion of source databases 109a-109n can be integrated with database server 108 (as shown in FIG. 1) or be located on a separate computing device or devices. It should be appreciated that system 100 can comprise any number of source databases 109a-109n (e.g., in a production computing system) each including a plurality of tables. For example, one or more source databases 109a-109n can correspond to one or more production systems or applications from which data can be extracted into one or more other databases—such as analytics database 109z.

In some embodiments, analytics database 109z can comprise data structures such as tables that aggregate or synthesize data elements from multiple different relational database tables across one or more source databases 109a-109n into a single data structure. For example, data elements that each relate to a characteristic or an aspect of a customer or employee (e.g., demographics, employment, life events) stored in multiple source tables can be combined into a single table in the analytics database. Analytics database 109z can be made available for interaction with downstream applications, such as business insight applications, human resources/employee management applications, customer relationship management (CRM) applications, and so forth. Typically, it is more computationally efficient for downstream applications to consume, e.g., customer or employee data from a single data structure instead of having to locate the individual data elements across multiple different tables and/or databases.

As described herein, it is beneficial to track changes to data in the source database(s) 109a-109n over time so that the integrity of data in the analytics database can be maintained, and so that an accurate timeline of historical changes can be referenced in the event of data discrepancies and/or missing data in analytics database 109z. System 100 incorporates a historical record database 106d for this purpose. In some embodiments, historical record database 106d can be located on database server computing device 108.

As described above, source databases 109a-109n can contain data used by one or more production computing systems or applications—for example, the data can comprise customer or employee demographic information (e.g., name, address, date of birth, contact information, gender, etc.), customer or employee employment event information (e.g., hiring, transfers, termination, etc.), or customer or employee life event information (e.g., marriage, birth of child, divorce, adoption, etc.). As can be appreciated, such data is subject to change over time as customers and/or employees move, change jobs, experience life events, and so forth. Existing source database systems are typically configured to overwrite existing data element values with the new values, and such changes are carried over automatically into analytics databases. However, as described herein, it is useful to capture the values for such source data elements—including recording the range of time that a particular data element had a specific value—in order to generate a historical record of the data changes from which a timeline of changes to the data elements can be created and subsequently used to verify and/or correct data in an analytics system. It should be appreciated that the above-identified customer and/or employee are merely examples, and that other types of data elements can be utilized in conjunction with the methods and systems described herein.

FIG. 2A is a diagram of exemplary source tables from one or more source databases 109a-109n. As shown in FIG. 2A, the source tables include a Demographics table 202, an Employment Event table 204, and a Life Event table 206. Each table contains a plurality of columns that include information associated with a customer or employee. For example, the Employment Event table 304 includes an event code column, an event name column, an event description column, an event date and time column, and an update date and time column. As can be appreciated, a single row in a table contains values in each column for a particular customer or employee.

FIG. 2B is a diagram of an exemplary table 208 in analytics database 109z that combines data elements from each of the source tables 202, 204, 206 in FIG. 2A. As shown in FIG. 2B, table 208 includes columns that are either (i) taken directly from one or more of the source tables (such as First Name, Last Name, etc.) or (ii) generated using data values from the source tables (such as Hire Date, Termination Date, etc.). Using the example of hire date, the Employment Event table 204 in FIG. 2A does not contain a specific column with the hire date. However, the table 204 does include the following columns that, when populated with specific values, indicate a hiring event:

Event Code column—'HIR'
Event Name column—'Hire'
Event Description column—'Employee first joined the company.'

The table 204 also includes the date and time of when the hiring event occurred, in the Event Date and Time column. When creating a record in the analytics table 208, data from the source table 204 is analyzed to identify a hiring event using the Event Code, Event Name, and/or Event Description columns and using the Event Date and Time column as the Hire Date in the analytics table 208.

Also, as can be appreciated, each record in the source tables 202, 204, 206 includes a primary key (e.g., ID Number column) that identifies the particular customer or employee that corresponds to the data record. When creating the analytics table 208, the primary key is used to associate records from each of the source tables 202, 204, 206 with each other.

As mentioned above, changes to the information in source tables 202, 204, 206 can occur over time after the analytics table is built. It is important to keep a historical record of these data changes so that the integrity of data in the analytics database can be maintained, and so that an accurate timeline of historical changes can be referenced in the event of data discrepancies and/or missing data in analytics database.

To accomplish these goals, system 100 is configured to capture and maintain a timeline of data changes that occur in the source databases 109a-109n. It should be appreciated that, in some embodiments, system 100 is configured to detect and capture data changes to only a subset of columns in source tables—instead of changes to any data element in the source tables. As can be appreciated, there may be data elements in the source tables that are not relevant to data stored in the analytics database 109z. To increase processing efficiency, system 100 is configured to monitor only those columns which are included in or contribute to the analytics database 109z, e.g., using a programmatic function that notifies change analysis module 106b when certain changes occur in source databases 109a-109n.

Figure 3:
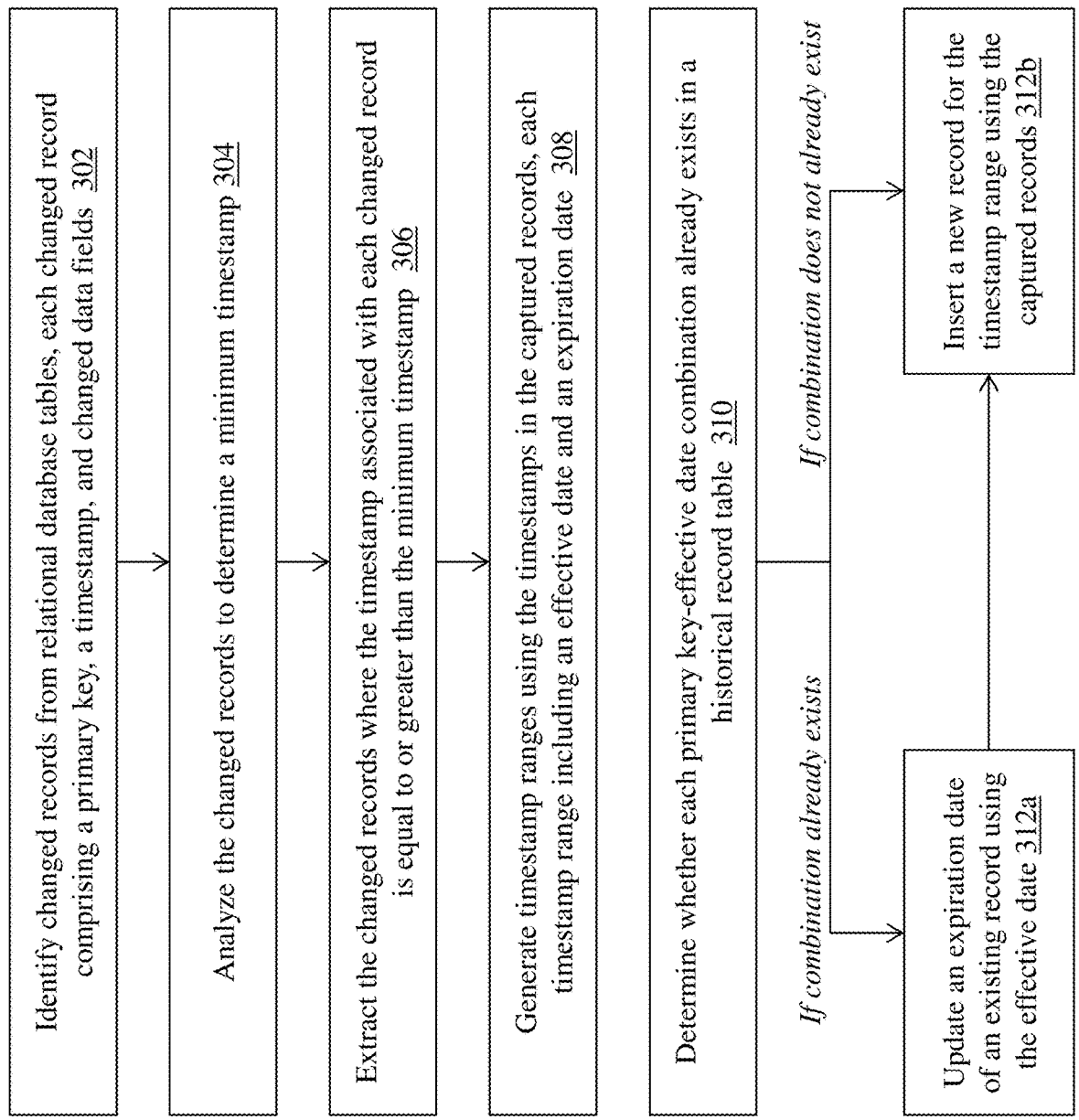
FIG. 3 is a flow diagram of a computerized method of capturing and maintaining a timeline of data changes in a relational database system.

FIG. 3 is a flow diagram of a computerized method 300 of capturing and maintaining a timeline of data changes in a relational database system, using system 100 of FIG. 1. Change analysis module 106b of application server computing device 106 identifies (step 302) a plurality of changed records from each of a plurality of relational database tables, e.g., stored in source databases 109a-109n. In some embodiments, change analysis module 106b is configured to receive indicia of changed data from source databases 109a-109n— for example, each of source databases 109a-109n can transmit changed data values along with the primary key associated with the changed data and the timestamp associated with the changed data to change analysis module 106b. In some embodiments, change analysis module 106b can store the changed data for a given time period in, e.g., a temporary data structure on server computing device 106. In some embodiments, change analysis module 106b can periodically poll the data in one or more source databases 109a-109z to identify whether any changes have occurred since the last polling.

FIG. 4 is a diagram of exemplary data changes received by change analysis module 106b from source databases 109a-109n. As shown in FIG. 4, module 106b received a first set of changes 402 corresponding to ID Number=100 on Mar. 1, 2023: the Address Line 1 column, the City column, and the Zip Code column of the Demographics table. Then, on Apr. 22, 2023, module 106b received a second set of changes 404 corresponding to ID Number=100 that indicate the employee/customer got married on April 2nd (as shown in the Event Date and Time column) and changed their address on April 22nd. Advantageously, change analysis module 106b can analyze each of these data changes for use by timeline maintenance module 106c and incorporation into historical record database 106d.

Turning back to FIG. 3, change analysis module 106b analyzes (step 304) the changed records to determine a minimum timestamp for each primary key. Determining the minimum timestamp for the changes associated with a particular primary key is important in building an accurate timeline of changes because multiple data changes to the same and/or different data records in the source databases 109a-109n could occur at the same time or on the same day. Using the example data in FIG. 4, change analysis module 106b determines that the minimum timestamp for changes associated with primary key ID Number=100 is '03-01-2023 08:45:00.' The minimum timestamp is used by change analysis module 106b and timeline management module 106c as the start of the changed data window for ID Number=100. It should be appreciated that, in some embodiments, change analysis module 106b can analyze the existing data in historical record table(s) of database 106d for the primary key and determine whether a minimum timestamp associated with the changed data is greater than a maximum timestamp of the existing data. If so, change analysis module 106b can use the maximum timestamp of the existing data as the starting point for data changes.

Now that change analysis module 106b has identified the starting point for data changes associated with each primary key, change analysis module 106b extracts (step 306) the changed records associated with each primary key from each relational database table where the timestamp associated with each changed record is equal to or greater than the minimum timestamp for the primary key. In some embodiments, module 106b re-scans the source databases 109a-109n using each primary key to extract all data changes for that primary key which occurred after the minimum timestamp in the changed data. Using the example data in FIG. 4, module 106b extracts data changes from source databases 109a-109n that correspond to ID Number=100 and that occurred on or after 03-01-2023 08:45:00. In this case, module 106b extracts the data for the first address change (set 402) and the data for the marriage life event and the second address change (set 404). It should be appreciated that there may not be any changed data in one or more source tables and/or source databases 109a-109n for a specific primary key during the change data window. In some embodiments, module 106b is configured to scan these source tables/source databases 109a-109n to confirm that no changes exist for that primary key.

Once the changed data is captured by module 106b, timeline management module 106c generates (step 308) one or more timestamp ranges for each primary key using the timestamps for the primary key in the captured records. Each timestamp range includes an effective date and an expiration date. In some embodiments, module 106b determines each unique timestamp for the primary key in the changed records and arranges the unique timestamps in a temporal sequence (e.g., oldest to newest). Module 106b then generates the timestamp range(s) by (i) assigning the unique timestamp as the effective date for the timestamp range; (ii) for each unique timestamp other than the most recent unique timestamp, assigning a timestamp immediately before the next unique timestamp in the sequence as the expiration date for the corresponding timestamp range; and (iii) for the most recent unique timestamp, assigning a default timestamp as the expiration date for the corresponding timestamp range. In some embodiments, the default timestamp can comprise a null value or a distant future value.

Using the example data in FIG. 4, timeline management module 106c generates the following timestamp ranges for primary key ID Number=100:

| ID Number | Effective Date | Expiration Date |
| --- | --- | --- |
| 100 | 03-01-2023 08:45:00 | 04-22-2023 13:19:02 |
| 100 | 04-22-2023 13:19:03 | 12-31-9999 59:59 |

Note that for the second timestamp range in the table above, the Expiration Date is set to the distant future. In some embodiments, this value can be stored or interpreted as an infinite value—indicating that the data values associated with the effective date of 04-22-2023 are the current active values for ID Number=100.

After generating the timestamp ranges, timeline management module 106c connects to historical record database 106d to process additions and/or updates to one or more historical record tables in database 106d based upon the changed data captured from source databases 109a-109n. As described previously, historical record database 106d includes data records reflecting the data changes occurring over time in source databases 109a-109n in a structure that can be quickly analyzed to identify prior values for certain data elements associated with a given ID Number and when those values were considered active.

FIG. 5 is a diagram of an exemplary historical record table 500 in historical record database 106d. As shown in FIG. 5, table 500 includes historical records that correspond to data changes captured over time for certain individuals (identified by ID Number column 502). For example, the first line of table 500 comprises a historical record for ID Number=100 that indicates John Smith had a job transfer event occur on Jan. 1, 2018 (as provided by the value of Effective Date column 504 in the first row) and that was in effect until Oct. 5, 2019 (as provided by the value of Expiration Date column 506 in the first row). At that time, John Smith had another job transfer event occur which is reflected in the second row of table 500. Because the value of Expiration Date column 504 in the second row is set to the distant future, this indicates that the values of the historical record in the second row are current values for ID Number=100. Therefore, a combination of the primary key (ID Number column 502) and the effective date (column 504) is used by timeline management module 106c to determine what changes should be made to the historical record table. As will be explained below, when additional data updates relating to ID Number=100 are captured by change analysis module 106b, the timeline management module 106c integrates these changes into the historical record table of database 106d.

Continuing with FIG. 3, timeline management module 106c determines (step 310) whether each primary key-effective date combination in the captured data records (e.g., as illustrated in FIG. 4) already exists in the historical record table in database 106d. Using the example of FIG. 4, module 106c identifies the following primary key-effective date combinations for the data changes:

| Primary Key (PK) | Effective Date (ED) |
|---|---|
| 100 | 03-01-2023 08:45:00 |
| 100 | 04-22-2023 19:03 |

Module 106c compares these combinations with data present in historical record database 106d. Based on the example of FIG. 5, module 106c confirms that the PK-ED combination of <'100,' '03-01-2023 08:45:00'> exists in historical record table 500 because the effective date of '03-01-2023 08:45:00' falls within the date range of the second row (i.e., between 10-05-2019 08:45:00 and 12-31-9999 11:59:59). Module 106c uses the effective date as the cutoff date for updating the existing records for the primary key in the historical record table.

For each primary-key effective date combination that already exists in the historical record database 106d, timeline management module 106c updates (step 312a) an expiration date of an existing record in the historical record table in database 106d using the effective date from the corresponding timestamp range for the captured data changes. Using the example of FIGS. 4 and 5, module 106c updates the Expiration Date column in the second row of table 500 based upon the effective date for the timestamp range corresponding to the first set of data changes captured by module 106b (402 in FIG. 4). FIG. 6 is a diagram of an exemplary historical record table 600 after timeline management module 106c has performed the update to the existing records. As shown in FIG. 6, the Expiration Date column 602 in the second row of table 600 has been changed from '12-31-9999 11:59:59' to '03-01-2023 08:44:59,' the latter date corresponding to one second before the effective date of the first address change (402) in FIG. 4.

Then, timeline management module 106c inserts (step 312b) a new record for the timestamp range into the historical database table using the captured records. Each new record inserted into the historical database table includes the primary key, the effective date, the expiration date, and the changed data fields from the captured records. FIGS. 7A, 7B, and 7C are diagrams of an exemplary historical record table 700 after timeline management module 106c has inserted new records into the table. As shown in FIG. 7A, the first new record 702 includes an effective date of '03-01-2023 08:45:00' (i.e., when the address of ID Number=100 changed), an expiration date of '12-31-9999 11:59:59,' any unchanged values from the prior historical record (e.g., First Name, Last Name, Job Transfer Date, etc.), and the changed data fields from the captured records (i.e., Address Line 1, City, Zip Code)—this reflects the first address change from dataset 402 of FIG. 4.

Module 106c repeats the update and insert steps to incorporate the second set 404 of data changes from FIG. 4—as shown in FIG. 7B, the prior record 702 is updated with an expiration date corresponding to immediately prior to the marriage life event and a new record 704 is added to include the marriage life event date (column 706). And as shown in FIG. 7C, the prior record 704 is updated with an expiration date corresponding to immediately prior to the second address change and a new record 708 is added to include the new address information. As can be appreciated, the historical record table now includes an accurate timeline of all data changes associated with ID Number=100—including the time frame of when those changes are/were active.

In some embodiments, at step 310, timeline management module 106c can determine that a primary key-effective date combination does not already exist in the historical record table of database 106d. For example, a new customer or employee may be recorded by the source databases 109a-109n. In these cases, timeline management module 106c does not perform the step of updating an existing record, but instead just inserts (step 312b) a new record for the timestamp range into the historical database table using the captured records.

Also, in some embodiments each unique primary key has a separate historical record table in database 106d, which results in each customer/employee's data changes being segregated into an individual data structure in database 106d. This implementation can provide greater processing efficiency in integrating updates and changes into the historical record for each customer or employee. Alternatively, the historical records for a plurality of customers/employees can be combined into a single historical record table in database 106d. This implementation has the benefit of enabling downstream applications to analyze the historical record data for multiple employees or customers in a reduced number of data access requests and/or data transactions to database 106d.

In some embodiments, application server computing device 106 can receive a request for historical record data from one or more remote computing devices—such as client computing device 102 and/or other devices that host downstream consumer applications configured to utilize the historical record data for business analysis purposes. The request can include a primary key (e.g., ID Number=100) and a timestamp range (e.g., '01-01-2020 12:00:00' to '01-01-2023 12:00:00'). Upon receiving the request, UI module 106a selects one or more data records from a historical record table in database 106d that have a primary key which matches the primary key contained in the request. UI module 106a can then filter the selected data records according to the timestamp range in the request and return the filtered data records to the remote computing device in response to the request.

Another beneficial feature that results from the methods and systems of capturing and maintaining a timeline of data changes in a relational database system as described above is the ability to 'rewind and replay,' that is, load or re-load historical records in database 106d while maintaining the complete tracking of historical data changes. For example, one or more of the source databases 109a-109n may contain incorrect customer or employee data at certain points in time, and that data may not be corrected until months or years in the future. Consider the scenario where an employee had a job transfer event occur several years ago that was not properly recorded in the source databases 109a-109n, and since then the employee has had two subsequent job transfer events that were properly recorded. The techniques described herein can be deployed to efficiently update the historical record table for the employee to correct the gap in historical data without requiring extensive data manipulation (such as deleting and re-adding records to the historical data). Instead, the data changes can be inserted into the historical record table seamlessly using the effective date and expiration date paradigm described herein.

FIGS. 8A and 8B are diagrams of an exemplary historical record table 800 both before and after timeline management module 106c has corrected a data discrepancy in the historical records. As shown in FIG. 8A, an existing historical record table for ID Number=247 shows that four different job transfer events have occurred over time—one in 2014, one in 2021, one in February 2023 and one in April 2023.

However, it is discovered that another job transfer event for ID Number=247 (which happened in 2019) was not properly added to the source databases 109a-109n. Change analysis module 106b and timeline management module 106c can capture and integrate this job transfer event into the historical record table 800—even though the event occurred four years ago. As shown in FIG. 8B, the historical record table for ID Number=247 is updated to integrate the missing job transfer event. The expiration date for existing data record 802 is updated, and a new data record 804 is inserted in the table 800 according to the proper historical sequence of events—thereby restoring the integrity and completeness of the historical record without requiring extensive and time-consuming data operations.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random-access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM)

protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A system for capturing and maintaining a timeline of data changes in a relational database system, the system comprising a server computing device having a memory for storing computer-executable instructions and a processor that executes the computer-executable instructions to:
   identify a plurality of changed records from each of a plurality of relational database tables, each changed record comprising a primary key, a timestamp, and one or more changed data fields;
   analyze the changed records to determine a minimum timestamp for each primary key;
   extract the changed records associated with each primary key from each relational database table where the timestamp associated with each changed record is equal to or greater than the minimum timestamp for the primary key;
   generate one or more timestamp ranges for each primary key using the timestamps for the primary key in the changed records, each timestamp range comprising an effective date and an expiration date;
   determine whether each primary key-effective date combination of the timestamp ranges already exists in a historical record table;
   for each primary key-effective date combination that already exists in the historical record table, update an existing record in the historical record table using the changed data fields from the changed record; and
   for each primary key-effective date combination that does not already exist in the historical record table, update an expiration date of an existing record in the historical record table using the effective date and insert a new record for the timestamp range, each new record comprising the primary key, the effective date, the expiration date, and the changed data fields from the changed record.

2. The system of claim 1, wherein the plurality of relational database tables comprises a demographics table, an employment event table, and a life event table.

3. The system of claim 2, wherein the server computing device loads the records from the historical record table into one or more database tables in a business analytics computing system.

4. The system of claim 1, wherein generating one or more timestamp ranges for each primary key comprises:
   determining each unique timestamp for the primary key in the changed records and arranging the unique timestamps in a temporal sequence;
   generating a timestamp range for each unique timestamp, including:
   assigning the unique timestamp as the effective date for the timestamp range,
   for each unique timestamp other than the most recent unique timestamp, assigning a timestamp immediately before the next unique timestamp in the sequence as the expiration date for the corresponding timestamp range, and
   for the most recent unique timestamp, assigning a default timestamp as the expiration date for the corresponding timestamp range.

5. The system of claim 4, wherein the default timestamp is a null value or a distant future value.

6. The system of claim 1, wherein identifying a plurality of changed records from each of a plurality of relational database tables comprises:
   determining one or more data fields of interest in each relational database table; and
   identifying the changed records from each relational database table where one or more of the data fields of interest has changed.

7. The system of claim 1, wherein the server computing device:
   receives a request for historical change data from a remote computing device, the request including a primary key and a timestamp range;
   selects data records from the historical record table that match the primary key from the request;
   filters the selected data records according to the timestamp range in the request; and
   returns the filtered data records to the remote computing device in response to the request.

8. A computerized method of capturing and maintaining a timeline of data changes in a relational database system, the method comprising:
   identifying, by a server computing device, a plurality of changed records from each of a plurality of relational database tables, each changed record comprising a primary key, a timestamp, and one or more changed data fields;
   analyzing, by the server computing device, the changed records to determine a minimum timestamp for each primary key;
   extracting, by the server computing device, the changed records associated with each primary key from each relational database table where the timestamp associated with each changed record is equal to or greater than the minimum timestamp for the primary key;
   generating, by the server computing device, one or more timestamp ranges for each primary key using the timestamps for the primary key in the captured records, each timestamp range comprising an effective date and an expiration date;

determining, by the server computing device, whether each primary key-effective date combination already exists in a historical record table;

for each primary key-effective date combination that already exists in the historical record table, update an existing record in the historical record table using the changed data fields from the changed record; and for each primary key-effective date combination that does not already exist in the historical record table, update an expiration date of an existing record in the historical record table using the effective date and insert a new record for the timestamp range, each new record comprising the primary key, the effective date, the expiration date, and the changed data fields from the changed record.

9. The method of claim 8, wherein the plurality of relational database tables comprises a demographics table, an employment event table, and a life event table.

10. The method of claim 9, wherein the server computing device loads the records from the historical record table into one or more database tables in a business analytics computing system.

11. The method of claim 8, wherein generating one or more timestamp ranges for each primary key comprises:

determining each unique timestamp for the primary key in the changed records and arranging the unique timestamps in a temporal sequence;

generating a timestamp range for each unique timestamp, including:

assigning the unique timestamp as the effective date for the timestamp range, for each unique timestamp other than the most recent unique timestamp, assigning a timestamp immediately before the next unique timestamp in the sequence as the expiration date for the corresponding timestamp range, and for the most recent unique timestamp, assigning a default timestamp as the expiration date for the corresponding timestamp range.

12. The method of claim 11, wherein the default timestamp is a null value or a distant future value.

13. The method of claim 8, wherein identifying a plurality of changed records from each of a plurality of relational database tables comprises:

determining one or more data fields of interest in each relational database table; and identifying the changed records from each relational database table where one or more of the data fields of interest has changed.

14. The method of claim 8, wherein the server computing device:

receives a request for historical change data from a remote computing device, the request including a primary key and a timestamp range;

selects data records from the historical record table that match the primary key from the request;

filters the selected data records according to the timestamp range in the request; and returns the filtered data records to the remote computing device in response to the request.

15. A computer program product for capturing and maintaining a timeline of data changes in a relational database system, the computer program product comprising a non-transitory computer-readable medium including instructions that, when executed by a server computing device, cause the server computing device to:

identify a plurality of changed records from each of a plurality of relational database tables, each changed record comprising a primary key, a timestamp, and one or more changed data fields;

analyze the changed records to determine a maximum timestamp for each primary key;

extract the changed records associated with each primary key from each relational database table where the timestamp associated with each changed record is equal to or greater than the maximum timestamp for the primary key;

generate one or more timestamp ranges for each primary key using the timestamps for the primary key in the captured records, each timestamp range comprising an effective date and an expiration date;

determine whether each primary key-effective date combination already exists in a historical record table;

for each primary key-effective date combination that already exists in the historical record table, update an existing record in the historical record table using the changed data fields from the changed record; and for each primary key-effective date combination that does not already exist in the historical record table, update an expiration date of an existing record in the historical record table using the effective date and insert a new record for the timestamp range, each new record comprising the primary key, the effective date, the expiration date, and the changed data fields from the changed record.

* * * * *